United States Patent
Kujirai

(10) Patent No.: US 8,446,613 B2
(45) Date of Patent: May 21, 2013

(54) INFORMATION PROCESSING APPARATUS AND METHOD AND PROGRAM OF CONTROLLING THE SAME

(75) Inventor: Yasuhiro Kujirai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1053 days.

(21) Appl. No.: 11/050,334

(22) Filed: Feb. 3, 2005

(65) Prior Publication Data

US 2005/0180791 A1 Aug. 18, 2005

(30) Foreign Application Priority Data

Feb. 16, 2004 (JP) .................................. 2004-038435

(51) Int. Cl.
*G06F 3/12* (2006.01)

(52) U.S. Cl.
USPC .......... 358/1.15; 358/1.9; 358/1.13; 358/1.14; 358/1.16; 709/203; 399/8; 399/9; 399/21; 399/24

(58) Field of Classification Search
USPC ....... 358/1.9, 1.13, 1.15, 1.14, 1.16; 709/203; 399/8, 9, 10, 11, 16, 18, 19, 21, 23, 24, 27, 399/31, 37
See application file for complete search history.

(56) References Cited

U.S. PATENT DOCUMENTS

| 6,348,971 B2 * | 2/2002 | Owa et al. ..................... 358/1.15 |
| 6,480,304 B1 * | 11/2002 | Os et al. ........................ 358/474 |
| 6,757,070 B1 * | 6/2004 | Lin et al. ........................ 358/1.1 |
| 2002/0089683 A1 | 7/2002 | Moro |
| 2002/0120742 A1 | 8/2002 | Cherry |
| 2003/0133146 A1 | 7/2003 | Parry |

FOREIGN PATENT DOCUMENTS

| JP | 06-161685 A | 6/1994 |
| JP | 09-146731 | 6/1997 |
| JP | 9-188007 A | 7/1997 |
| JP | 9-188007 A | 7/1997 |
| JP | H11-312065 A | 11/1999 |
| JP | 12-132361 A | 5/2000 |
| JP | 2000-132361 A | 5/2000 |
| JP | 2001-125761 A | 5/2001 |
| JP | 2002-351631 | 12/2002 |

* cited by examiner

*Primary Examiner* — Vu B Hang
(74) *Attorney, Agent, or Firm* — Carter, DeLuca, Farrell & Schmidt LLP

(57) ABSTRACT

An information processing apparatus capable of communicating with a printing device includes an input unit for inputting a search condition for searching for a desired printing device, a display unit for displaying at least one printing device that satisfies the search condition, a selection unit for selecting a printing device from the at least one printing device displayed by the display unit, and a setting unit for setting the search condition input by the input unit as a printing setting for the printing device selected by the selection unit in accordance with selection of the printing device by the selection unit.

7 Claims, 11 Drawing Sheets

FIG. 8

INFORMATION OF OUTPUT DESTINATION

OUTPUT DESTINATION
NAME  PRINTER A
ADDRESS  123.123.1.1

PRESETS FOR OUTPUT DESTINATION
PRINTER A ~801
PRINTER B
PRINTER C
ADD ~802

O. K.
CANCEL

INFORMATION PROCESSING APPARATUS AND METHOD AND PROGRAM OF CONTROLLING THE SAME

BACKGROUND OF THE INVENTION

1. Field of the Invention

The present invention relates to information processing apparatuses capable of communicating with printing devices and to methods and programs of controlling the information processing apparatuses.

2. Description of the Related Art

Network systems in which a plurality of printing devices are connected to a plurality of host computers via a network and in which each of the plurality of printing devices can perform printing in accordance with printing instructions from the plurality of host computers have been available.

In such systems, when a user sends a printing instruction from a host computer so that printing processing is performed, the user first needs to choose a desired printing device from among a plurality of printing devices. Here, various selection criteria are possible. For example, a printing device having desired functions, such as a color printing function and a two-sided printing function, may be selected. Alternatively, a printing device located in a place nearest to the user may be selected. Technologies for searching for a printing device that satisfies various conditions desired by a user from among a plurality of printing devices on a network and for providing the found printing device to the user are known.

In many cases, printers that have been selected by a user are registered as so-called "favorites" and are used repeatedly. Also, printing settings for actual printing, such as the paper size, the resolution, color printing, and two-sided printing, are often set in the same way every time printing is performed. Japanese Patent Laid-Open No. 9-188007 describes a technology in which printing settings are registered for each of a plurality of printing devices registered in a host computer. A user definition name corresponding to a printing device is selected such that the printing device used as an output destination and printing settings for the selected printing device can be set at the same time. Accordingly, the user does not need to set printing settings every time a printing device used as an output destination is selected.

For the known technologies, printing settings and an output destination can be stored in association with each other. However, when a user inputs desired search conditions, a printing device that satisfies the conditions are searched for, and printing processing is performed using the found printing device, printing settings must be set before the printing processing is performed.

In other words, in order to search for a desired printing device, the user needs to input functions of the printing device as search conditions. Also, the user needs to set the desired functions again as printing settings for the found printing device. Thus, the number of operations required for the user increases.

SUMMARY OF THE INVENTION

The present invention can set a function of a printing device as a search condition and as a printing setting at the same time. Accordingly, a printing processing environment convenient for a user is provided.

According to a first aspect of the present invention, an information processing apparatus capable of communicating with a printing device includes an input unit for inputting a search condition for searching for a desired printing device, a display unit for displaying at least one printing device that satisfies the search condition, a selection unit for selecting a printing device from the at least one printing device displayed by the display unit, and a setting unit for setting the search condition input by the input unit as a printing setting for the printing device selected by the selection unit in accordance with selection of the printing device by the selection unit.

The information processing apparatus may further include a changing unit for changing the printing setting set by the setting unit in accordance with a user instruction.

Other features, objects and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 shows an example of an output destination information screen displayed on the host computer according to the embodiment of the present invention.

DESCRIPTION OF THE EMBODIMENTS

Embodiments of the present invention will now be described.

Figure 1:
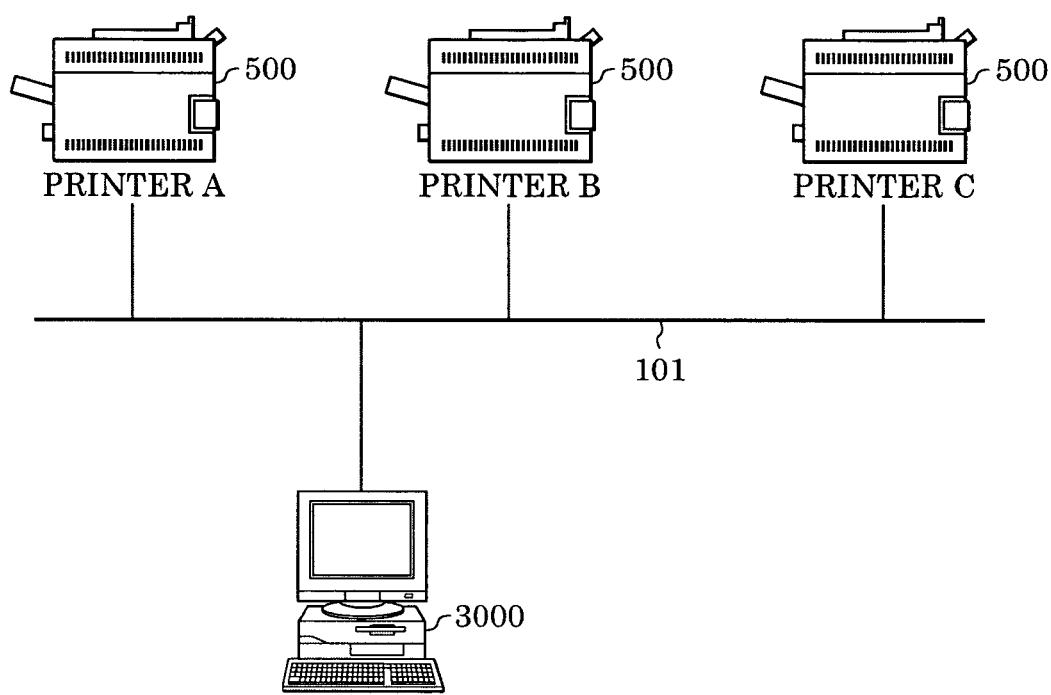
FIG. 1 shows an example of the structure of a printing processing system according to an embodiment of the present invention.

FIG. 1 is a schematic diagram showing the structure of a system according to an embodiment of the present invention. A host computer 3000 is connected to a plurality of printers 500 (printers A, B, and C) on a network 101. The host computer 3000 and each of the printers 500 can communicate with each other via the network 101.

Figure 2:
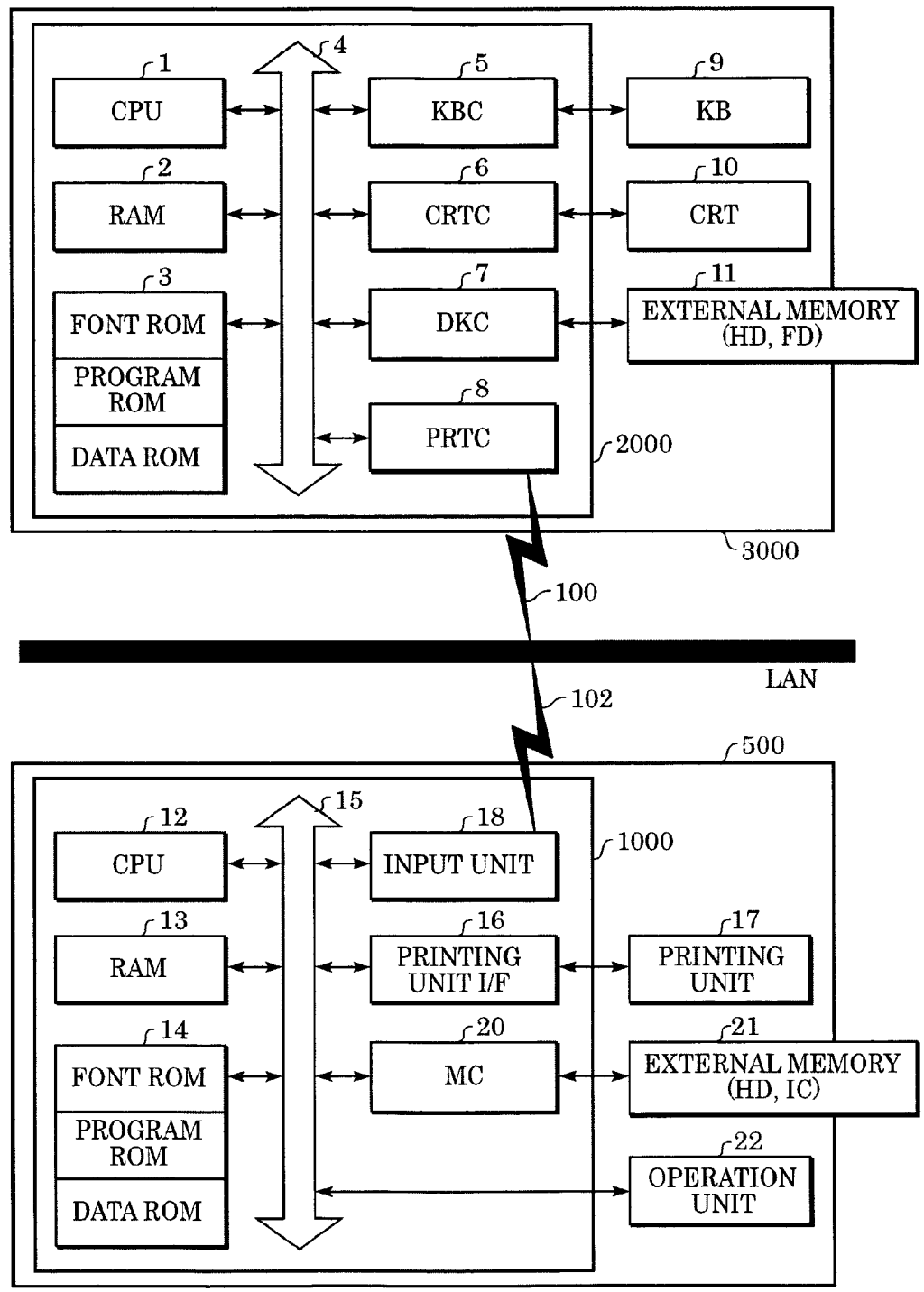
FIG. 2 is a block diagram showing the internal structure of the printing processing system according to the embodiment of the present invention.

FIG. 2 is an example of a block diagram showing the structure of a printing processing system according to an embodiment of the present invention. Unless otherwise specified, the host computer 3000 may be connected to each of the printers 500 via a local-area network (LAN), a wide-area network (WAN), a public circuit, or the Internet.

Referring to FIG. 2, the host computer 3000 includes a central processing unit (CPU) 1. The CPU 1 performs document processing in which drawings, images, characters, tables (including spreadsheets), and the like are mixed together, in accordance with a document processing program and the like stored in a program read-only memory (program ROM) of a ROM 3 or in an external memory 11. The CPU 1 generally controls each unit connected to a system bus 4.

In addition, the program ROM of the ROM 3 or the external memory 11 stores an operating system program, hereinafter, referred to as an OS, and the like for controlling the CPU 1. A font ROM of the ROM 3 or the external memory 11 stores font data used for the document processing. A data ROM of the ROM 3 or the external memory 11 stores various types of data used for the document processing and the like.

A random-access memory (RAM) 2 functions as a main memory, a work area, and the like of the CPU 1.

A keyboard controller (KBC) 5 controls key input from a keyboard (KB) 9 and a pointing device (not shown). A cathode-ray tube (CRT) controller (CRTC) 6 controls display of a CRT display (CRT) 10.

A disk controller (DKC) 7 controls access to the external memory 11, such as a hard disk (HD) and a floppy disk (FD), that stores a boot program, various applications, font data, user files, files being edited, a printer control command generation program, hereinafter, referred to as a printer driver, and the like.

A printer controller (PRTC) 8 is connected to the printer 500 via a network 100, and performs bidirectional communication control processing with the printer 500. A command corresponding to a connection protocol may be added to a print job in the process of transmission. The OS may also automatically add the command.

The CPU 1, for example, performs rasterization of outline fonts in a display information RAM that is set on the RAM 2, so that "What You See Is What You Get (WYSIWG)" can be achieved on the CRT 10.

The CPU 1 also opens registered various windows on the CRT 10 in accordance with commands instructed via a pointing device (i.e., mouse) or the like (not shown), and performs various types of data processing. For printing processing, a user opens a window for printing settings and sets a printing processing procedure for the printer driver. For example, setting of a printer and selection of a printing mode can be performed.

In the printer 500, a CPU 12 outputs an image signal as output information to a printing unit (printer engine) 17 via a printing unit interface (I/F) 16 connected to a system bus 15 in accordance with a control program and the like stored in a program ROM of a ROM 14 or stored in an external memory 21.

The program ROM of the ROM 14 also stores a control program and the like for controlling the CPU 12. A font ROM of the ROM 14 stores font data used for generating the output information. If a printer, not including the external memory 21, such as a hard disk, is used, a data ROM of the ROM 14 stores information used in the host computer.

The CPU 12 is capable of communicating with the host computer 3000 via an input unit 18 and a network 102. Information and the like within the printer 500 can be reported to the host computer 3000 via this interface. Data received from the printer driver is stored in a RAM 13, and converted into an image signal in accordance with the control program. Interpretation of a command added in accordance with a communication protocol is also performed based on the control program.

The RAM 13 functions as a main memory, a work area, and the like of the CPU 12, and is capable of expanding the size of the memory by an option RAM connected to an expanded port (not shown). The RAM 13 is used for an output information development region, an environmental data storage region, a nonvolatile RAM (NVRAM), and the like.

Access of the external memory 21, such as a hard disk (HD) or an IC card, is controlled by a memory controller MC 20. The external memory 21 is connected as an option, and stores font data, emulation programs, form data, and the like. At least one external memory is provided, but the number of external memories is not limited to one. A plurality of external memories storing an option font card and a program for interpreting printer control languages of different language systems, in addition to stored fonts, may be connected.

An operation unit 22, which is an operation panel, includes operation switches, a light-emitting diode (LED) display, a liquid crystal panel, and the like. Furthermore, an NVRAM (not shown) may be provided to store printer mode setting information from the operation unit 22.

Figure 3:
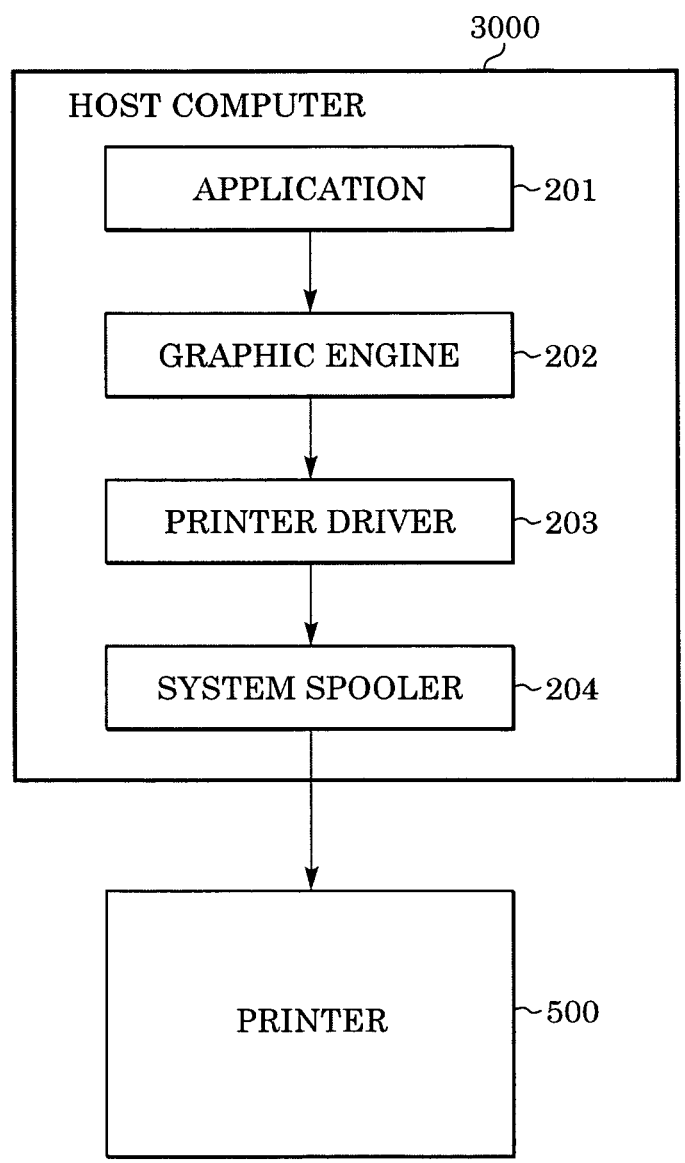
FIG. 3 is a block diagram showing the software structure of a host computer.

FIG. 3 shows the structure of typical printing processing performed on a host computer 3000 to which a printing device, such as a printer 500, is directly connected or connected via a network. An application 201, a graphic engine 202, a printer driver 203, and a system spooler 204 exist as files stored in the external memory 11, and are program modules that are loaded into the RAM 2 to be executed by an OS or by a module using the corresponding module. The application 201 and the printer driver 203 can be added to the HD of the external memory 11 via the FD of the external memory 11, a CD-ROM (not shown), or a network (not shown). Although the application 201 stored in the external memory 11 is loaded into the RAM 2 to be executed, when the application 201 performs printing for the printer 500, the graphic engine 202 that is loaded into the RAM 2 to be executable is used for rendering.

Similarly, the graphic engine 202 loads the printer driver 203, which is prepared for each printing device, from the external memory 11 into the RAM 2, and sets an output of the application 201 to the printer driver 203. The graphic engine 202 converts a graphic device interface (GDI) function received from the application 201 into a device driver interface (DDI) function, and outputs the DDI function to the printer driver 203. The printer driver 203 converts the DDI function received from the graphic engine 202 into a control command that can be recognized by the printer, such as a page description language (PDL). The converted printer control command is output as printing data to the printer 500 via the system spooler 204, which is loaded into the RAM 2 via the OS, and an interface.

Figure 4:
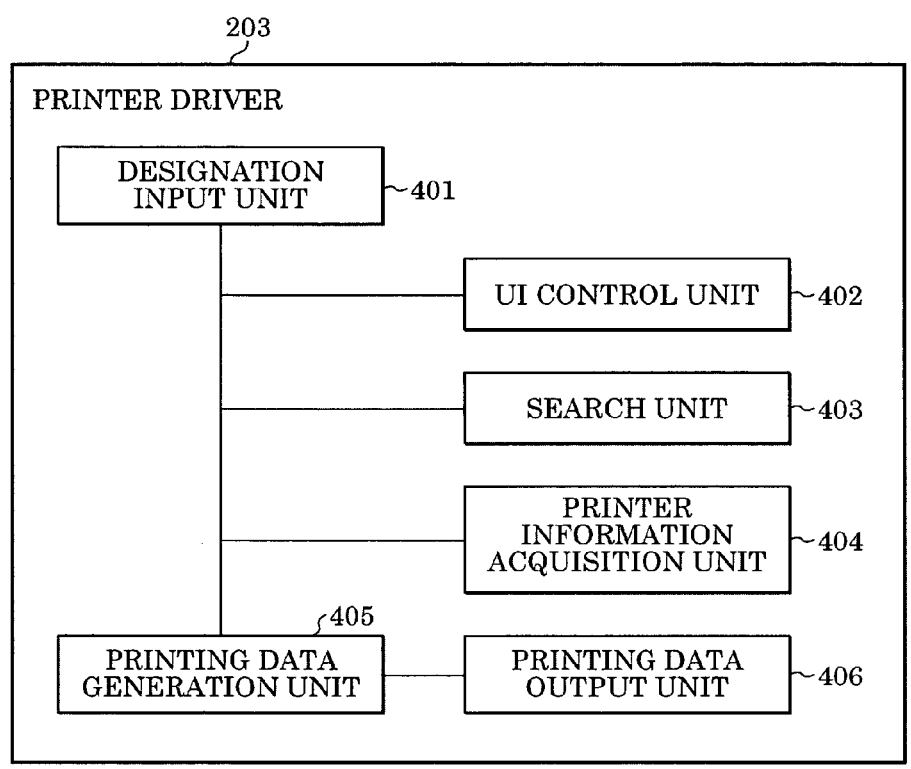
FIG. 4 is a block diagram showing the internal structure of a printer driver.

FIG. 4 is a schematic diagram showing the internal structure of the printer driver 203 according to this embodiment. The printer driver 203 includes a designation input unit 401 for receiving user designations for printing settings, search conditions, and the like. When a designation is given by the designation input unit 401, a user interface (UI) control unit 402 controls a UI to display the designation in a way easily understood by the user. For example, if two-sided printing is set as one of the search conditions, then for a printing setting screen for a printer that can perform two-sided printing, the UI is controlled to display the screen so as to be able to set "two-sided printing". In contrast, if two sided printing is not set as one of the search conditions, then for a printing setting screen for a printer that cannot perform two-sided printing, the UI is controlled to display the screen so as not to be able to set "two-sided printing". Accordingly, the user can know the functions provided in the printer found by search from the UI. When the designation input unit 401 receives a user instruction for executing search, a search unit 403 searches for a printer having a function desired by the user. More specifically, when the user gives a search instruction, a printer information acquisition unit 404 refers to printers on the network for functional information and acquires the functional information of each of the printers. The printer information acquisition unit 404 compares the acquired functional information of each of the printers with the search conditions input by the designation input unit 401, and the UI control unit 402 causes the UI to display a printer that satisfies the conditions. However, a procedure for searching for a printer is not limited to this, and other procedures may be used. A printing data generation unit 405 generates printing data based on the printing settings input by the designation input unit 401, and a printing data output unit 406 outputs the generated printing data to the system spooler 204.

Figure 5:
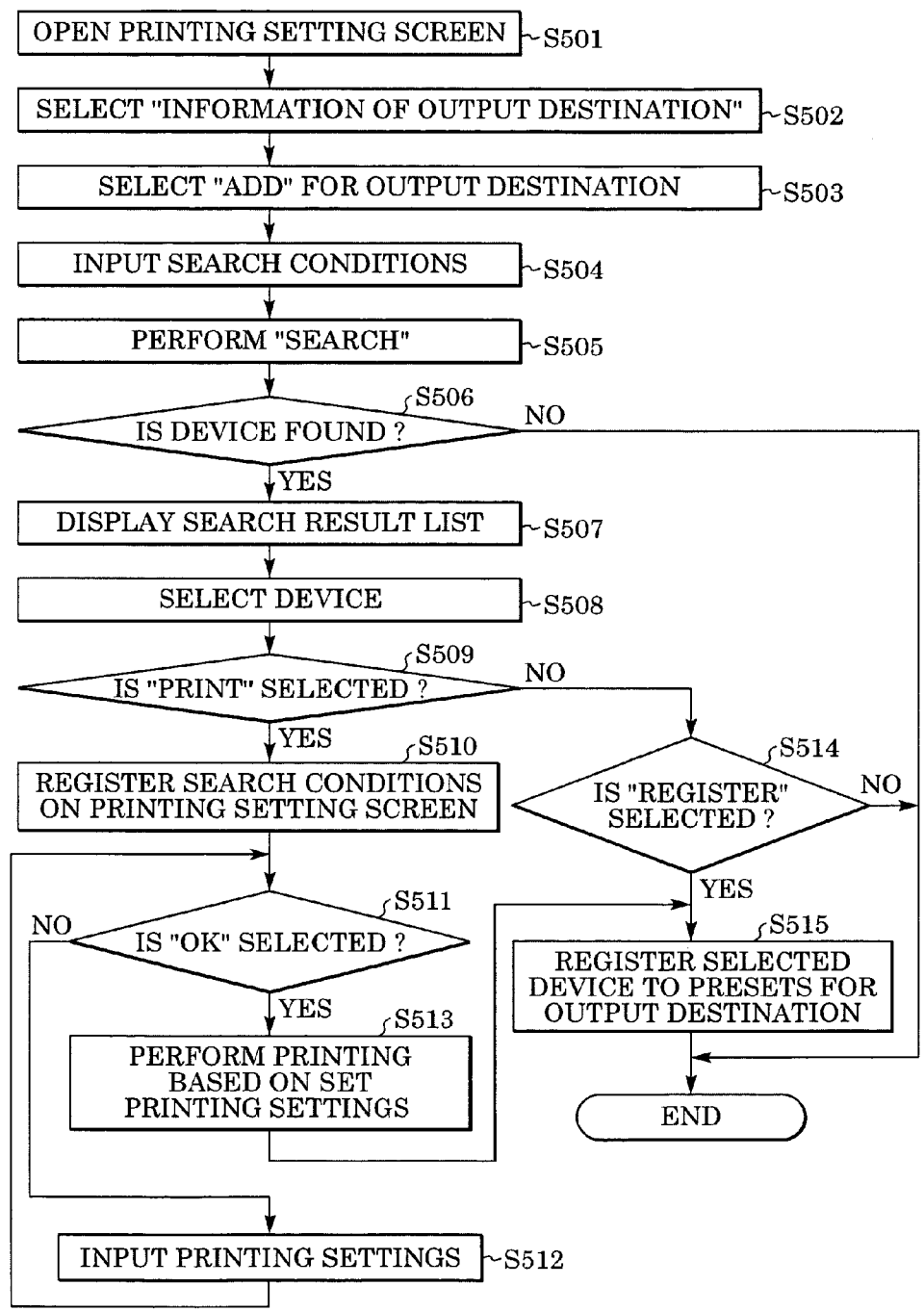
FIG. 5 is a flowchart showing a printing process according to the embodiment of the present invention.

FIG. 5 is a flowchart showing a printing process according to the present invention from printer search to printing processing. FIGS. 6 to 10 are display examples in corresponding steps shown in FIG. 5 performed by the UI of the host computer 3000.

The printing process according to the present invention will be described with reference to FIG. 5 and FIGS. 6 to 11.

Figure 6:
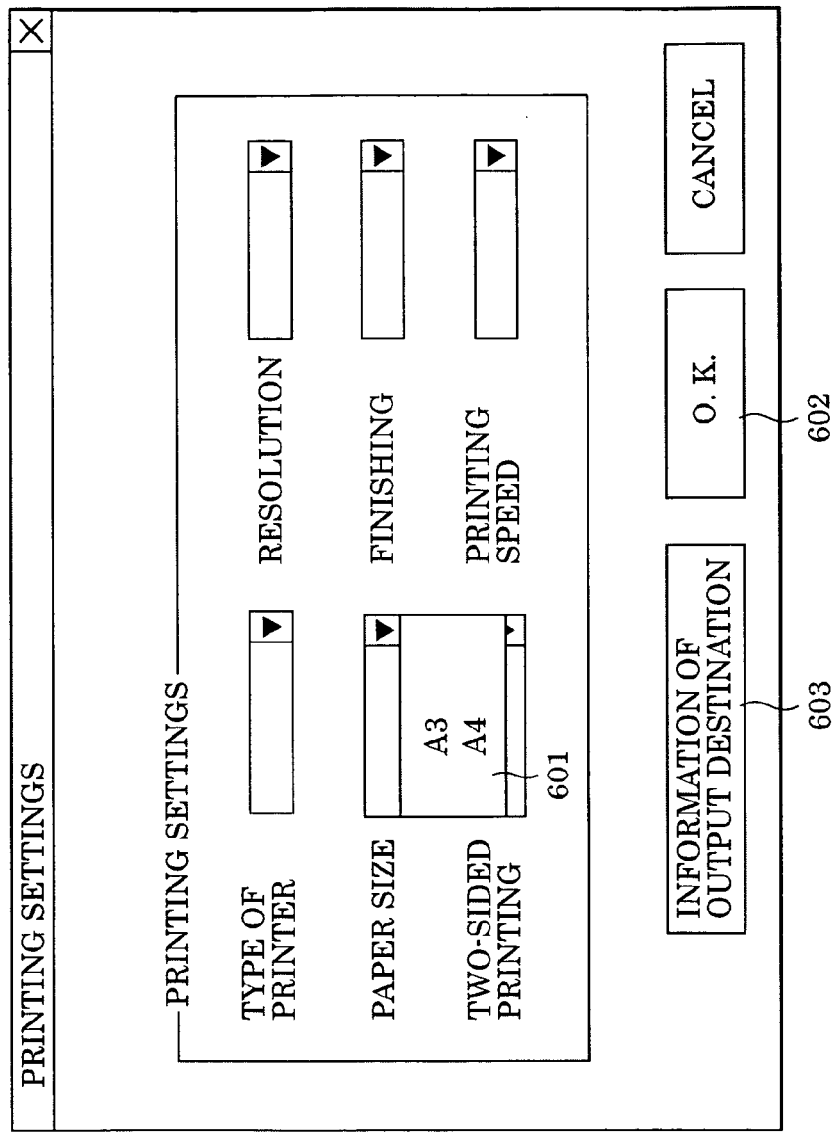
FIG. 6 shows an example of a printing setting screen displayed on the host computer according to the embodiment of the present invention.

In step S501, a printing setting screen is opened. The printing setting screen can be opened at the time of a printing request from the application 201. FIG. 6 shows a display example of the printing setting screen when printing settings are designated. As shown in FIG. 6, the type of printer, the resolution, the paper size, and the like are displayed as printing setting items that can be set by the user. In the example shown in FIG. 6, the details that can be set in each item are displayed by user's selection of a pull-down menu bar using an input device, such as a mouse (for example, a pull-down menu field 601 in FIG. 6). Printing setting items are not limited to the items shown in FIG. 6. Printing setting items other than the items displayed in FIG. 6 may be set. When an "OK" button 602 is selected, printing processing based on the set printing settings is performed.

Figure 7:
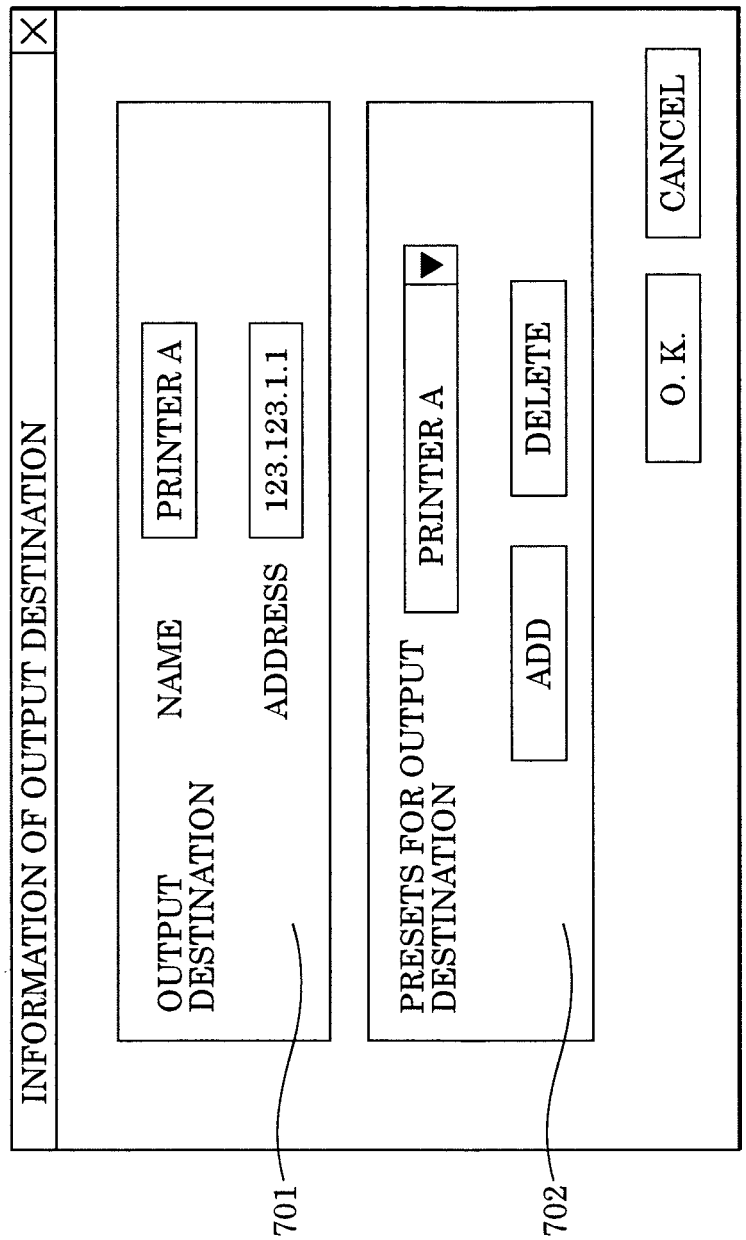
FIG. 7 shows an example of an output destination information screen displayed on the host computer according to the embodiment of the present invention.

When an "information of output destination" button 603 is selected in step S502, an output destination information screen shown in FIG. 7 is displayed. In the example shown in FIG. 7, the name and address of a printer currently registered as an output destination is displayed in an output destination column 701, so that the user can confirm the printer to which data is output. The user can also see a list of printers, via a pull-down menu, that can currently be used in an output destination preset column 702 as presets for output destinations. When the pull-down menu bar is selected, a pull-down menu field 801 is displayed, as shown in FIG. 8. In the example shown in FIG. 8, the pull-down menu field 801 indicates that printers A, B, and C can currently be used. Accordingly, a printer selected from the printer list can be registered as an output destination.

Figure 9:
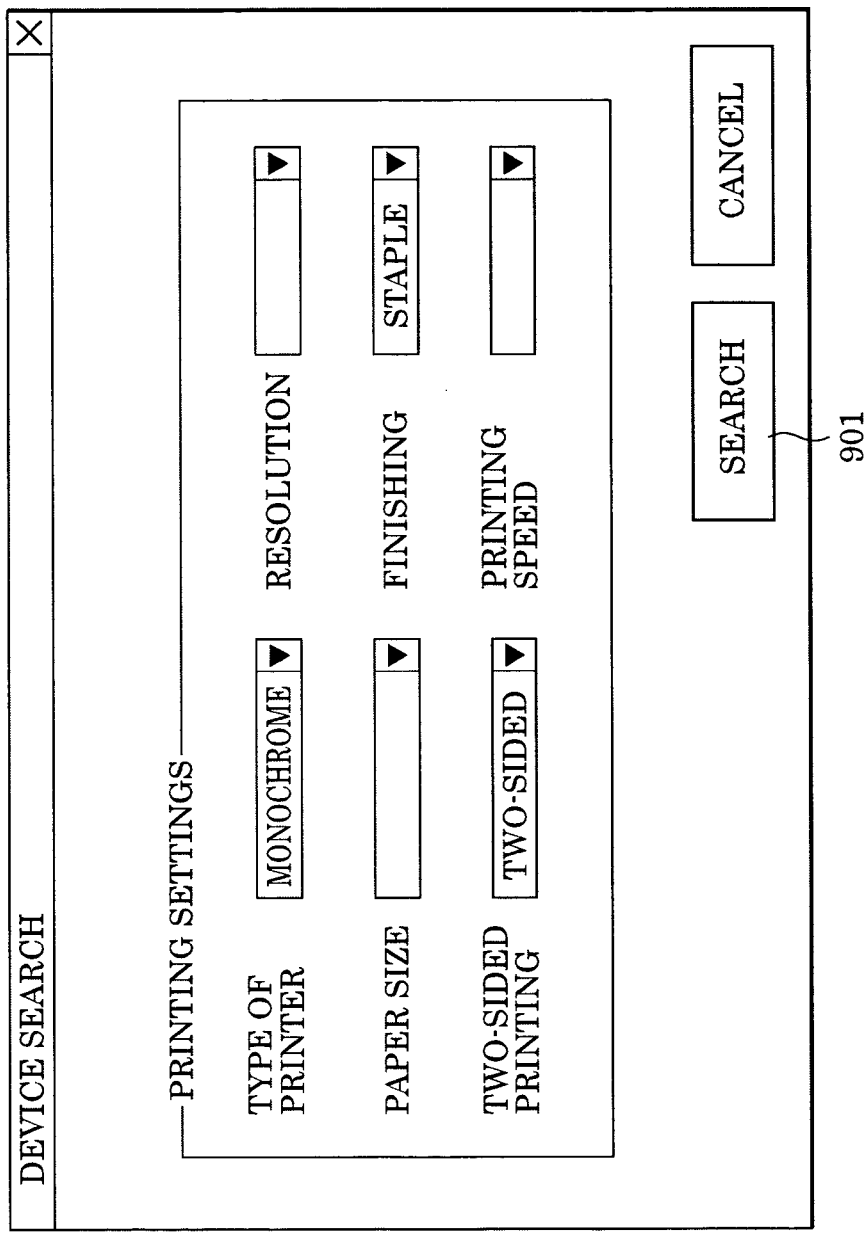
FIG. 9 shows an example of a device search screen displayed on the host computer according to the embodiment of the present invention.

When an "add" button 802 shown in FIG. 8 is selected, a device search screen shown in FIG. 9 is displayed (step S503). The user selects desired printing settings on the screen shown in FIG. 9. In the example shown in FIG. 9, a case where the user selects "monochrome", "two-sided printing", and "staple" is displayed (step S504). Also, in the example shown in FIG. 9, items such as the paper size, the resolution, and the like, for which printing settings are not selected, are excluded from search conditions. When the user inputs desired search conditions and selects a "search" button 901, a printer on the network that satisfies the input printing settings is searched for (step S505).

Figure 10:
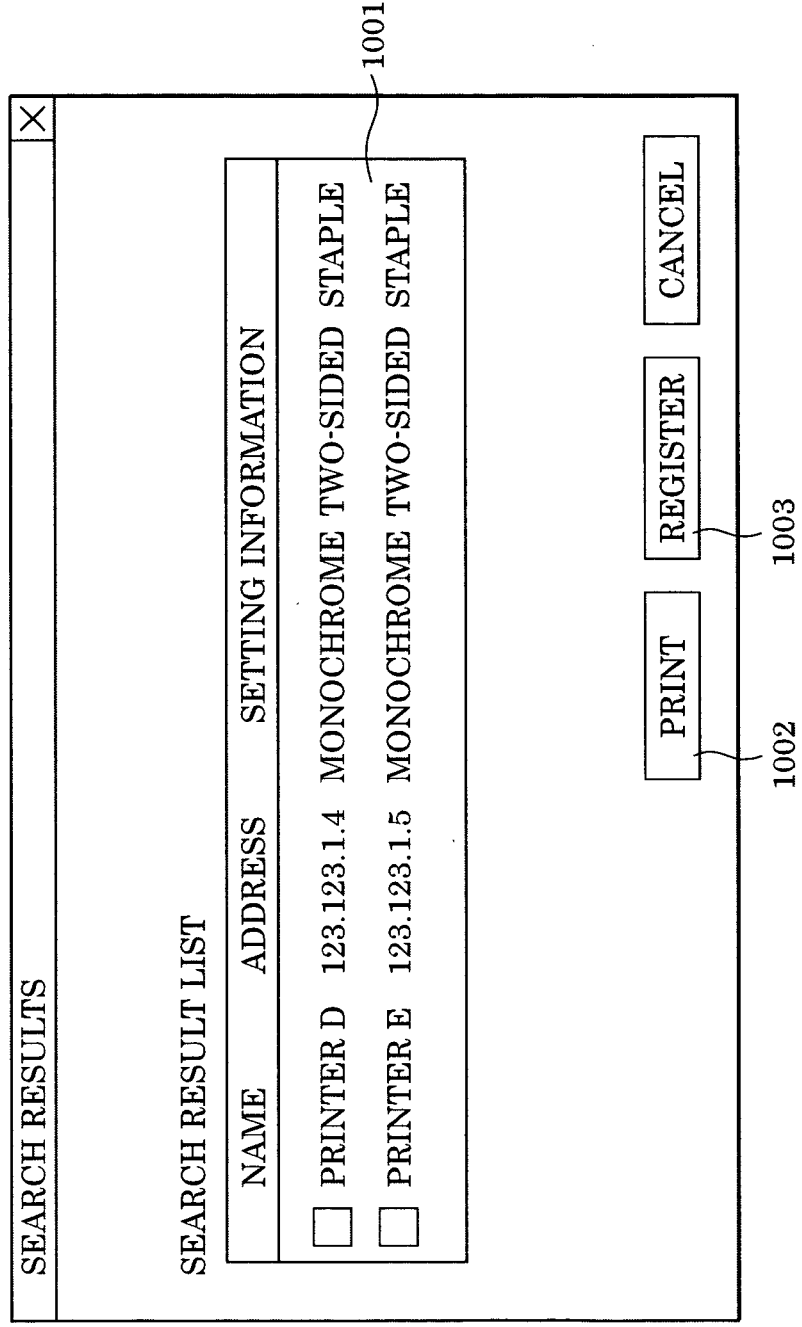
FIG. 10 shows an example of a device search result screen displayed on the host computer according to the embodiment of the present invention.

If a printer that satisfies the input printing settings is found in accordance with the search result in step S506, a search result display screen in which a search result list is displayed, as shown in FIG. 10, is displayed (step S507). In the example shown in FIG. 10, a case where printers D and E satisfy the search conditions, such as "monochrome", "two-sided printing", and "staple", input by the user via the display of FIG. 9, is shown. A search result list column 1001 displays the search conditions input by the user as setting information, as well as the names and addresses of printers. Thus, the user can know functions provided in each printer.

Figure 11:
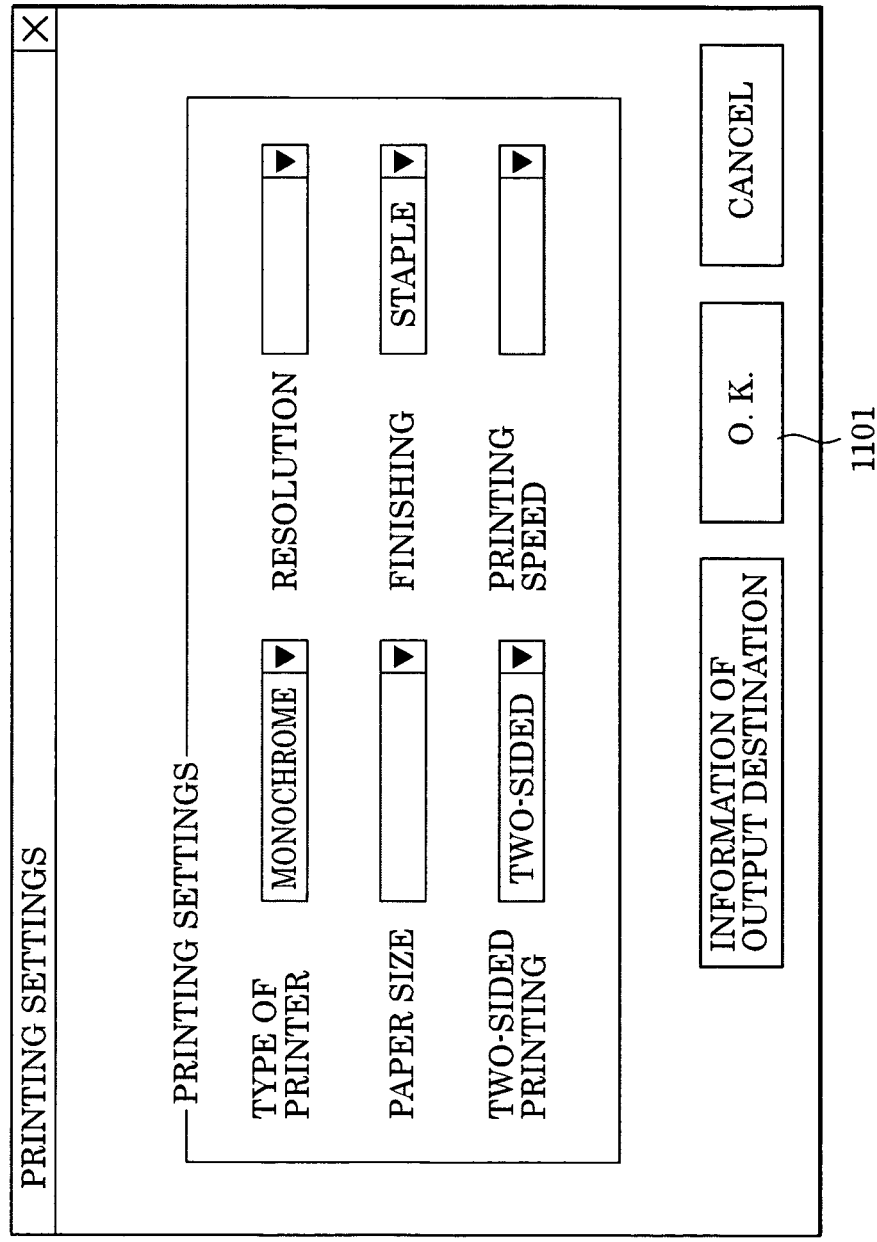
FIG. 11 shows an example of a printing setting screen displayed on the host computer according to the embodiment of the present invention.

Then, in step S508, the user selects a printer indicated on the search result screen. The process then determines whether a "print" button 1002 is selected (step S509). If the "print" button 1002 is selected, a screen shown in FIG. 11 is displayed (step S510). The screen shown in FIG. 11 is the same as the printing setting screen shown in FIG. 6, with the exception that some printing settings have already been registered. The registered printing settings shown in FIG. 11 are equal to the search conditions input by the user in step S504. In other words, when a printer that satisfies the search conditions input in step S504 performs printing, the user does not need to input the printing settings again. Since the printing settings input as the search conditions are already registered, printing can be performed with the desired printing settings.

Next, it is determined whether or not an "OK" button 1101 shown in FIG. 11 is selected (step S511). If the "OK" button 1101 is selected, printing processing based on the set printing settings is performed (step S513), and the process ends. If the "OK" button 1101 is not selected in step S511, printing settings can be changed (step S512). Printing is not necessarily performed using printing settings used for search conditions.

When printing settings are input in step S512, printing processing based on the input printing settings is performed. Also, since the selected device is registered to the presets for output destinations when the printing processing is performed, the printer can be readily used the next time without performing search processing.

If the "print" button 1002 is not pressed in step S509, the process determines whether a "register" button 1003 is pressed in step S514. If the "register" button 1003 is pressed, the device selected in step S508 is registered to the presets for output destinations shown in the pull-down menu field 801 in FIG. 8 in step S515, and the process ends.

Although this embodiment has been described by way of example of a printer, the present invention is also applicable to other devices, such as a copying machine, a compound machine, a scanner, and a facsimile machine.

An aspect of the present invention is achieved by supplying a storage medium on which program code for realizing the functions of the foregoing embodiments is stored to a system or an apparatus and by reading and executing the program code stored in the storage medium by a computer (or a CPU or a micro-processing unit (MPU)) of the system or the apparatus.

In this case, the program code itself read from the storage medium attains functions of the foregoing embodiments. The storage medium storing the program code constitutes the present invention.

Also, the storage medium for supplying the program code may be, any recording medium, such as a floppy disk, a hard disk, an optical disk, a magneto-optical disk, a compact disk (CD)-ROM, a CD-recordable (CD-R), a digital versatile disk (DVD)-ROM, a DVD-R, a magnetic tape, a nonvolatile memory card, a ROM, a storage device contained in a file server on a network, or a storage device contained in a file transfer protocol (FTP) server on the Internet.

Also, the functions of the foregoing embodiments can be attained not only by performing the read program code by the computer but also by performing part or all of the actual processing by an OS or the like running on the computer on the basis of instructions of the program code.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-038435 filed Feb. 16, 2004, which is hereby incorporated by reference herein.

What is claimed is:

1. An information processing apparatus for communicating with a printing device, comprising:
    a device search display unit adapted to display a search condition inputting screen for inputting by a user a search condition for searching for a desired printing device;
    a search result display unit adapted to display a search result screen for selectably displaying at least one printing device satisfying the search condition and for receiving a user's instruction for printing by a selected printing device or registering the selected printing device;
    a registration unit adapted to register, when the user's instruction for registering the selected printing device is received at the search result screen, the selected printing device as a preset for an output destination;
    a printing setting display unit adapted to display, when the user's instruction for printing by the selected printing device is received at the search result screen, a printing setting screen for inputting by the user a printing setting used to perform a printing process in the selected printing device, for each of a plurality of printing setting items; and
    a printing processing unit adapted to perform, if the printing setting input to the printing setting screen displayed by the printing setting display unit is changed by the user, the printing process using the changed printing setting, and perform, if the printing setting input to the printing setting screen displayed by the printing setting display unit is not changed, the printing process using the printing setting,
    wherein the printing setting display unit displays the printing setting screen in a state that the printing setting used as the search condition is automatically input without a user operation for, among the plurality of the printing setting items, the item used as the search condition.

2. The information processing apparatus according to claim 1, wherein the printing setting display unit displays a function that is not provided in the printing device so as not to be settable as a printing setting.

3. The information processing apparatus according to claim 1, further comprising a search unit adapted to search for the at least one printing device that satisfies the search condition.

4. An information processing method capable of communicating with a printing device, comprising:
    displaying a search condition inputting screen for inputting by a user a search condition for searching for a desired printing device;
    displaying a search result screen for selectably displaying at least one printing device satisfying the search condition and for receiving a user's instruction for printing by the selected printing device or registering the selected printing device;
    registering, when the user's instruction for registering the selected printing device is received at the search result screen, the selected printing device as a preset for an output destination;
    displaying, when the user's instruction for printing by the selected printing device is received at the search result screen, a printing setting screen for inputting by the user a printing setting used to perform a printing process in the selected printing device, for each of a plurality of printing setting items; and
    performing, if the printing setting input to the printing setting screen is changed by the user, the printing process using the changed printing setting, and perform, if the printing setting input to the printing setting screen is not changed, the printing process using the printing setting,
    wherein the printing setting screen is displayed in a state that the printing setting used as the search condition is automatically input without a user operation for, among the plurality of the printing setting items, the item used as the search condition.

5. A non-transitory computer-readable storage medium encoded with a computer-executable program for causing a method for an information processing apparatus to communicate with a printing device, the method comprising:
    displaying a search condition inputting screen for inputting by a user a search condition for searching for a desired printing device;
    displaying a search result screen for selectably displaying at least one printing device satisfying the search condition and for receiving a user's instruction for printing by the selected printing device or registering the selected printing device;
    registering, when the user's instruction for registering the selected printing device is received at the search result screen, the selected printing device as a preset for an output destination;
    displaying, when the user's instruction for printing by the selected printing device is received at the search result screen, a printing setting screen for inputting by the user a printing setting used to perform a printing process in the selected printing device, for each of a plurality of printing setting items; and
    performing, if the printing setting input to the printing setting screen is changed by the user, the printing process using the changed printing setting, and perform, if the printing setting input to the printing setting screen is not changed, the printing process using the printing setting,
    wherein the printing setting screen is displayed in a state that the printing setting used as the search condition is automatically input without a user operation for, among the plurality of the printing setting items, the item used as the search condition.

6. The information processing apparatus according to claim 1, wherein the printing setting display unit displays the printing setting screen in a state that the printing setting is not input for, among the plurality of the printing setting items, the item not used as the search condition.

7. The information processing apparatus according to claim 1, wherein the plurality of the printing setting items include at least two of "type of printer", "paper size", "two-sided printing", "resolution", "finishing", and "printing speed".

\* \* \* \* \*